United States Patent
Huan

[11] Patent Number: 5,848,799
[45] Date of Patent: Dec. 15, 1998

[54] FORK BLADE PACKING STRUCTURE FOR A BICYCLE FRONT FORK

[76] Inventor: Su-We Huan, No. 5-15, Lun Ya Lee, Lun Ya Lane, Yuanlin Chen, Changhwa Hsein, Taiwan

[21] Appl. No.: 824,782

[22] Filed: Mar. 26, 1997

[51] Int. Cl.⁶ ................................................. B62K 25/08
[52] U.S. Cl. ........................... 280/276; 280/280; 267/175
[58] Field of Search ...................... 280/274, 275, 280/276, 279, 280, 281.1, 283; 267/175, 177, 249, 221

[56] References Cited

U.S. PATENT DOCUMENTS

| | | | |
|---|---|---|---|
| 2,475,774 | 7/1949 | Benson | 280/276 |
| 3,984,119 | 10/1976 | Okazima | 267/177 |
| 5,284,352 | 2/1994 | Chen | 280/276 |
| 5,301,973 | 4/1994 | Truchinski | 280/276 |
| 5,310,203 | 5/1994 | Chen | 280/275 |
| 5,445,401 | 8/1995 | Bradbury | 280/276 |
| 5,470,090 | 11/1995 | Stewart et al. | 280/276 |

*Primary Examiner*—Brian L. Johnson
*Assistant Examiner*—Gary Savitt
*Attorney, Agent, or Firm*—Vardell Legal Group

[57] ABSTRACT

A fork blade packing structure including a socket mounted in a bicycle fork blade at the top, a push block threaded onto a screw rod in the bicycle fork blade and supported on a spiral spring therein and moved vertically to adjust the spring force of the spiral spring, a connector mounted within the socket and having a threaded bottom end threaded into a top center screw hole on the push block and a top end extended out of socket through a hole thereof, a knob fixedly fastened to the top end of the connector outside the socket and adapted for turning the connector by a hand tool to force the push block upwards or downwards, and a guide wire mounted in an annular groove around the socket and having a guide top inserted through a radial through hole in the socket into a longitudinal sliding groove on the push block for guiding the movement of the push block.

1 Claim, 3 Drawing Sheets

5,848,799

FORK BLADE PACKING STRUCTURE FOR A BICYCLE FRONT FORK

BACKGROUND AND SUMMARY OF THE INVENTION

The present invention relates to a fork blade packing structure for a bicycle front fork, and more particularly to such a simple structure of fork blade packing structure which permits the spring force of the spiral spring of the bicycle fork blade to be conveniently and positively adjusted.

In a bicycle fork blade, a bolt is provided at the top and adapted for turning by a hand tool to adjust the spring force of a spiral spring. Because the bolt is moved up and down along a spiral track, the spiral spring tends to be twisted when compressed by the bolt. If the spiral spring is excessively twisted, it can not function well.

The present invention has been accomplished to provide a fork blade packing structure which eliminates the aforesaid problem. According to the present invention, the fork blade packing structure comprises a socket mounted in a bicycle fork blade at the top, a push block threaded onto a screw rod in the bicycle fork blade and supported on a spiral spring therein and moved vertically to adjusted the spring force of the spiral spring, a connector mounted within the socket and having a threaded bottom end threaded into a top center screw hole on the push block and a top end extended out of socket through a hole thereof, a knob fixedly fastened to the top end of the connector outside the socket and adapted for turning the connector by a hand tool to force the push block upwards or downwards, and a guide wire mounted in an annular groove around the socket and having a guide tip inserted through a radial through hole in the socket into a longitudinal sliding groove on the push block for guiding the movement of the push block. Because the push block is moved vertically, the spiral spring is not twisted when compressed.

DETAILED DESCRIPTION OF THE PREFERRED EMBODIMENT

Figure 1:
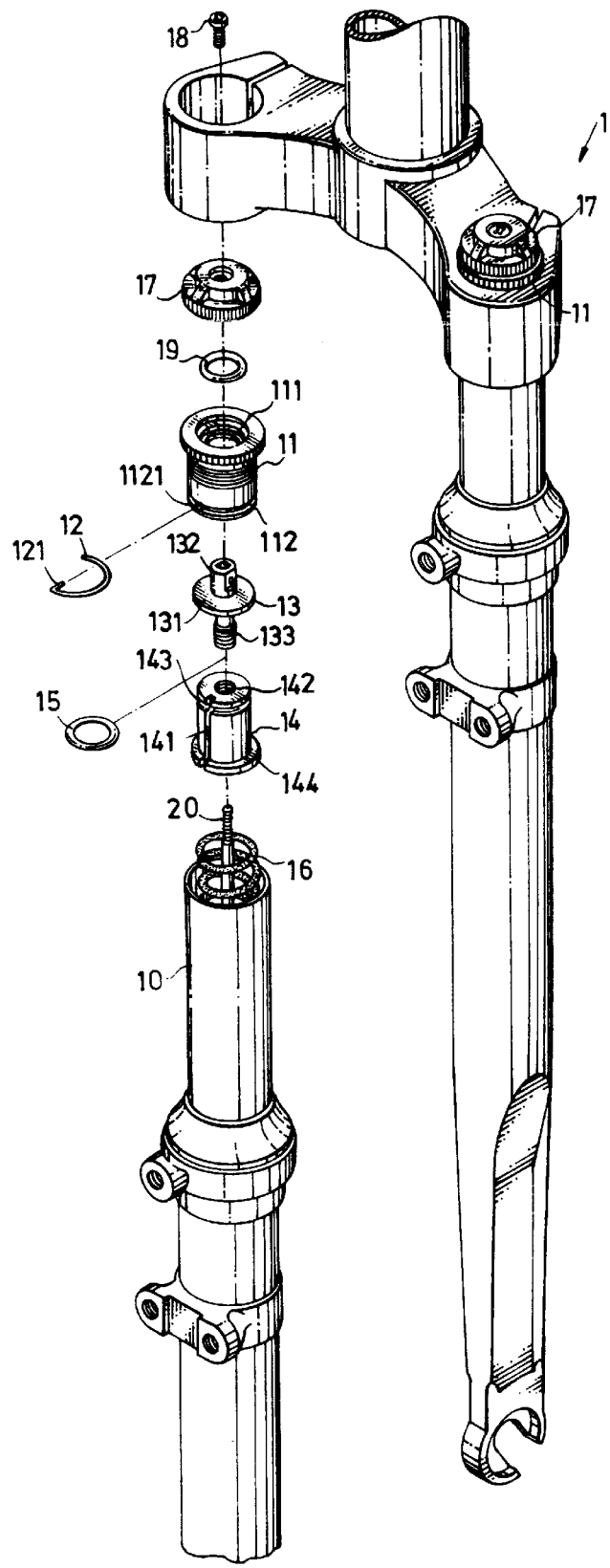
FIG. 1 is an exploded view of the present invention.
Figure 2:
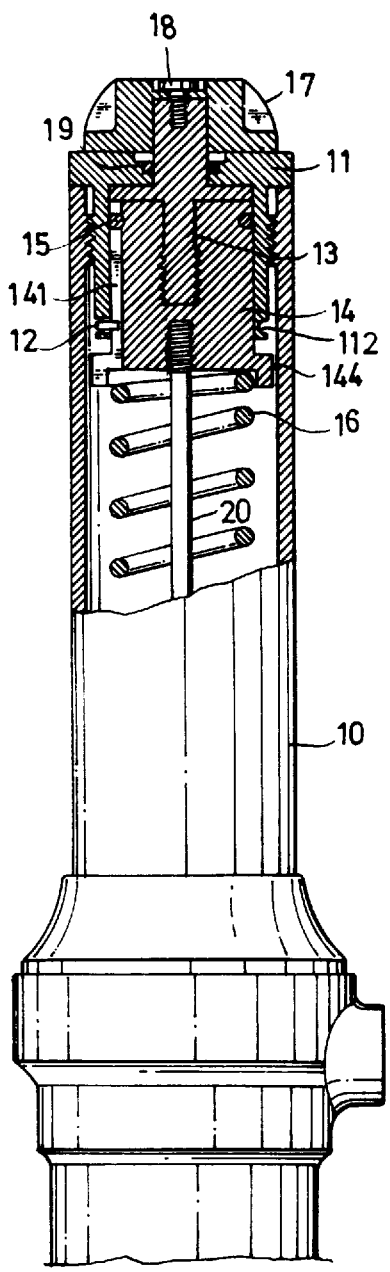
FIG. 2 is a sectional assembly view of the present invention.
Figure 3:
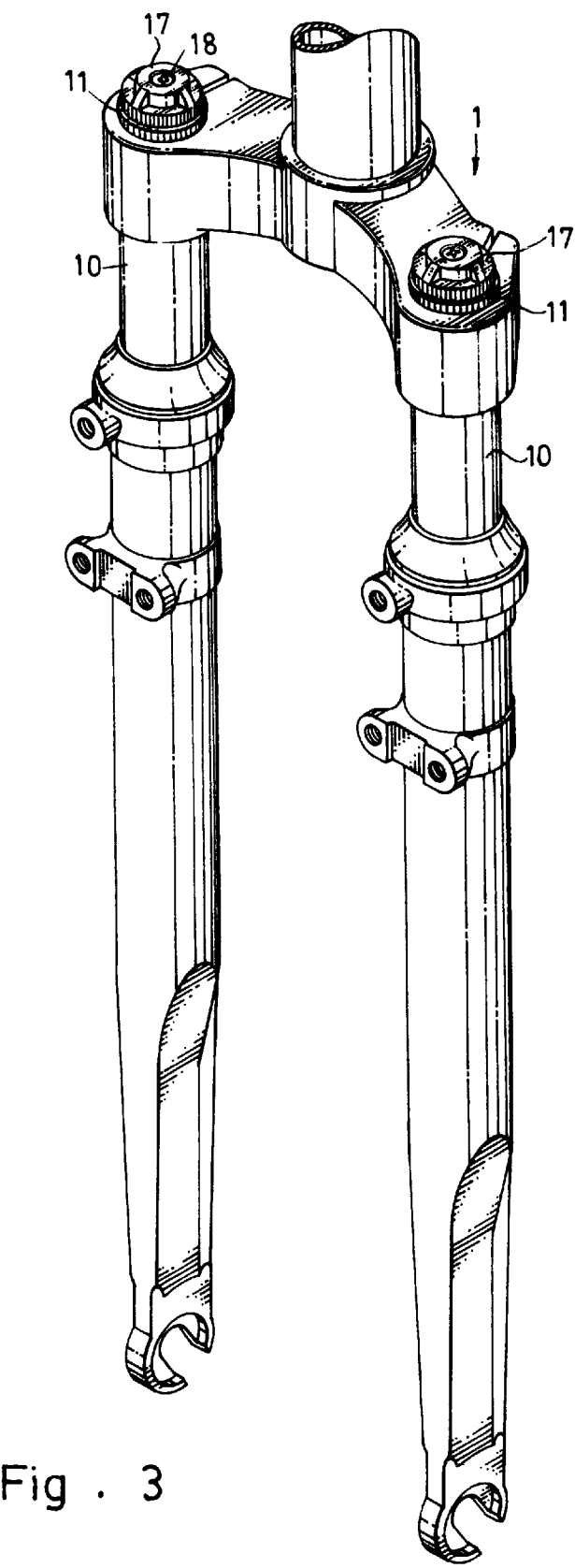
FIG. 3 is an elevational view of a bicycle front fork according to the present invention.

Referring to FIGS. 1, 2 and 3, a bicycle front fork 1 is adapted to be fastened to a head tube of a bicycle frame (not shown), having two parallel fork blades 10 adapted to be connected to a wheel hub of a bicycle front wheel (not shown).

Each fork blade 10 has a screw rod 20 longitudinally disposed on the inside and a spiral spring 16 mounted on the inside around the screw rod 20, and is packed with a socket 11, a substantially arched guide wire 12, a connector 13, a push block 14, a clamping ring 15 and a knob 17. The socket 11 is a shaped like a stepped tube mounted in the fork blade 10 at the top, having a stepped center hole 111 at the center of its top side, an annular groove 112 around the periphery near its bottom end, and a radial through hole 1121 through the annular groove 112. The push block 14 is a cylindrical block threaded onto the screw rod 20 of the fork blade 10 and supported on the spiral spring 16 inside the blade 10 within the socket 11, having a top center screw hole 142, an annular groove 143 around the periphery near its top side which receives a packing ring 15, a longitudinal sliding groove 141 on periphery, and a bottom flange 144 stopped at the spiral spring 16. The guide wire 12 is mounted in the annular groove 112 of the socket 11 within the fork blade 10, having one end terminating in an inward guide tip 121. The inward guide tip 121 is inserted through the radial through hole 1121 of the sockt 11 and perpendicularly forced into engagement with the longitudinal sliding groove 141 of the push block 14. The connector 13 is mounted inside the socket 11, having an internally threaded top coupling rod 132 inserted through the stepped center hole 111 of the socket 11, an externally threaded bottom coupling rod 133 threaded into the top center screw hole 142 of thhe push block 14, and a collar 131 disposed between the push block 14 and the socket 11. The knob 17 is fixedly fastened to the internally threaded top coupling rod 132 of the connector 13 by a screw 18. Further, a rubber ring 19 is mounted around the top coupling rod 132 of the connector 13 within the stepped center hole 111 of the socket 11 below the knob 17 to prohibit dust from passing to the inside of the fork blade 10. Through the knob 17, the connector 13 can be turned with a hand too. When the connector 13 is rotated, the push block 14 is forced to move upwards or downwards linearly. Because the guide tip 121 of the guide wire 12 is perpendicularly inserted into the longitudinal sliding groove 141 of the push block 14, the push block 14 is maintained in course when it is forced to move upwards or downwards.

I claim:

1. A fork blade packing structure mounted in a top end of a bicycle fork blade having an axially disposed screw rod and a spiral spring around its screw rod, and controlled to adjust the spring force of said spiral spring, comprising:

a socket shaped like a stepped tube mounted in the top end of said bicycle fork blade, having a stepped top center hole, an annular groove around the periphery near a bottom end thereof, and a radial through hole through its annular groove;

a cylindrical push block threaded onto the screw rod of said bicycle fork blade and supported on said spiral spring within said socket, said push block having a center screw hole at the center of a top side thereof, an annular groove around the periphery near its top side, a bottom flange stopped at said spiral spring, and a longitudinal sliding groove on the outside between its top side and its bottom flange, said push block being moved in and out of said socket to adjust the spring force of said spiral spring;

a guide wire mounted in the annular groove of said socket within said bicycle fork blade, having an inward guide tip at one end inserted through the radial through hole of said socket and perpendicularly forced into engagement with the longitudinal sliding groove of said push block to guide its movement;

a connector mounted inside said socket, having an internally threaded top coupling rod inserted through the stepped top center hole of said socket, an externally threaded bottom coupling rod threaded into the top center screw hole of said push block, and a collar disposed between said push block and said socket;

a knob fixedly fastened to the interanlly threaded top coupling rod of said connector by a screw, and driven to turn said connector forwards or backwards, causing said push block to be moved upwards or downwards; and a rubber ring mounted around the top coupling rod of said connector within the stepped top center hole of said socket below said knob.

\* \* \* \* \*